United States Patent [19]

Vischer

[11] 4,230,476
[45] Oct. 28, 1980

[54] APPARATUS AND METHOD FOR OBTAINING UNIFORM GOBS IN A TRIPLE GOB FEEDER

[75] Inventor: Peter Vischer, Golden, Colo.

[73] Assignee: Coors Container Company, Golden, Colo.

[21] Appl. No.: 26,099

[22] Filed: Apr. 2, 1979

[51] Int. Cl.³ .................................................. C03B 7/08
[52] U.S. Cl. ........................................ 65/128; 65/129; 65/327; 65/328; 222/146 C; 222/420; 222/478
[58] Field of Search ................. 65/126, 128, 129, 132, 65/327, 328; D15/136; 222/420, 146 C, 478

[56] References Cited

U.S. PATENT DOCUMENTS

| D241,269 | 8/1976 | Fentzke | D15/136 |
|---|---|---|---|
| 3,516,812 | 6/1970 | Donnelly et al. | 65/128 X |
| 3,554,726 | 1/1971 | Daly | 65/126 X |
| 3,560,188 | 2/1971 | Winzer | 65/328 |
| 3,582,309 | 6/1971 | Bracken | 65/328 |
| 3,625,671 | 12/1971 | Schirm et al. | 65/128 X |
| 3,711,266 | 1/1973 | Daly | 65/328 |

Primary Examiner—Richard V. Fisher
Attorney, Agent, or Firm—Bruce G. Klaas; Dennis K. Shelton; Richard D. Law

[57] ABSTRACT

An apparatus and method for use in a triple gob feeder of a glass forming apparatus for forming molten glass gobs of uniform size, weight, volume and shape by equalizing the temperatures of the molten glass flowing through orifices in a triple gob orifice ring. Molten glass is retained in a middle reservoir of the triple gob orifice ring for a relatively longer average period of time than in end reservoirs of the ring preferably by providing a middle reservoir having a relatively larger volumetric size than the end reservoirs. In addition, the middle reservoir is cooled by directing a coolant through channels in a bottom surface portion of the orifice ring and onto external surfaces surrounding the middle reservoir.

17 Claims, 9 Drawing Figures

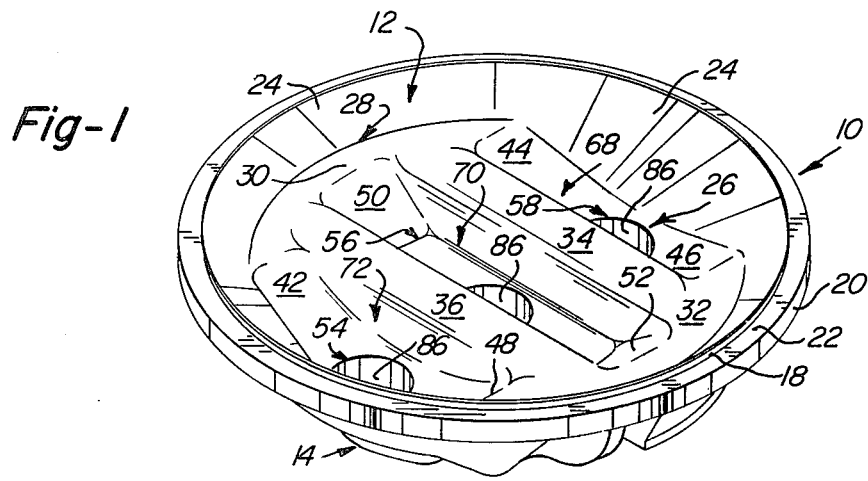
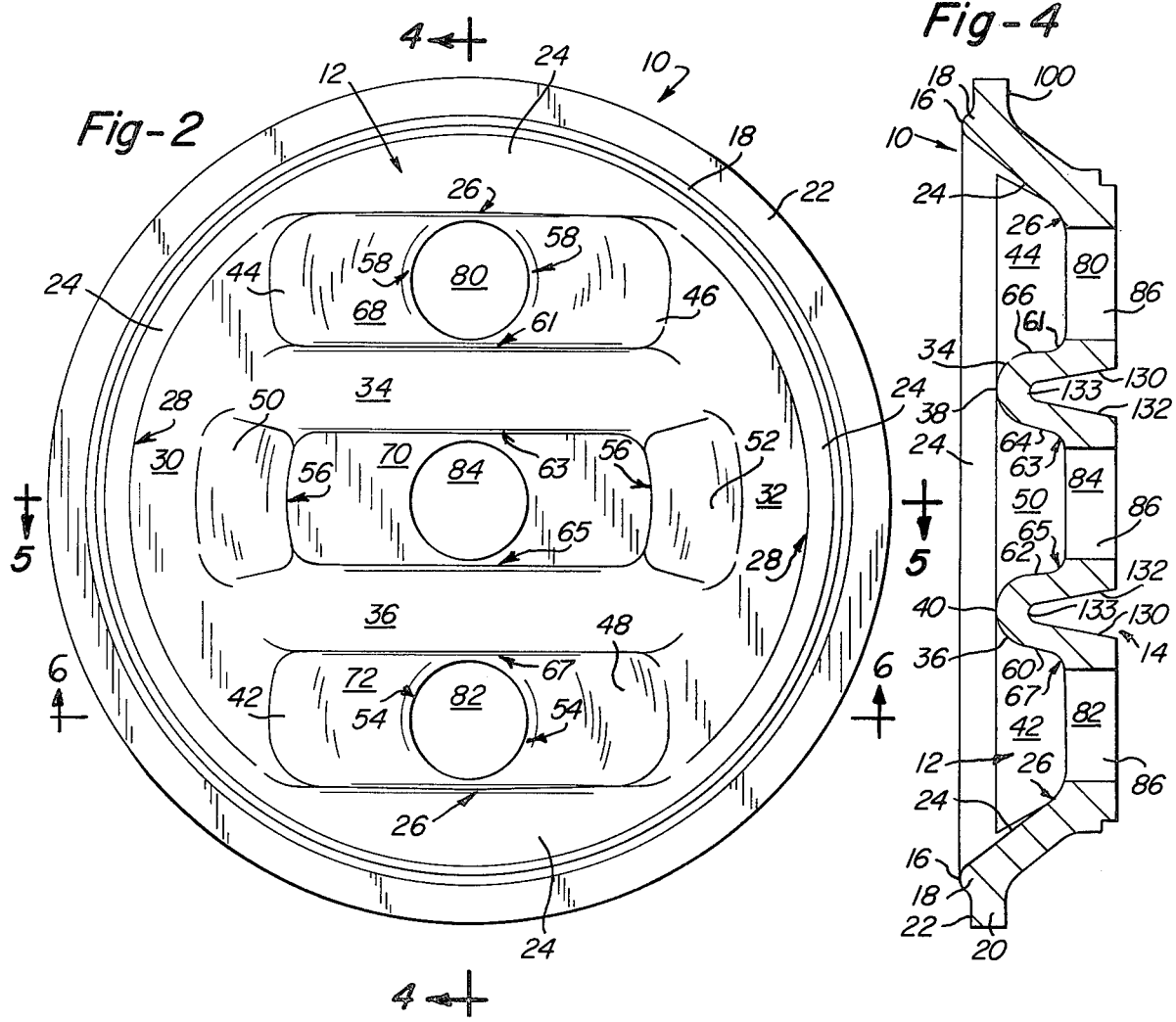

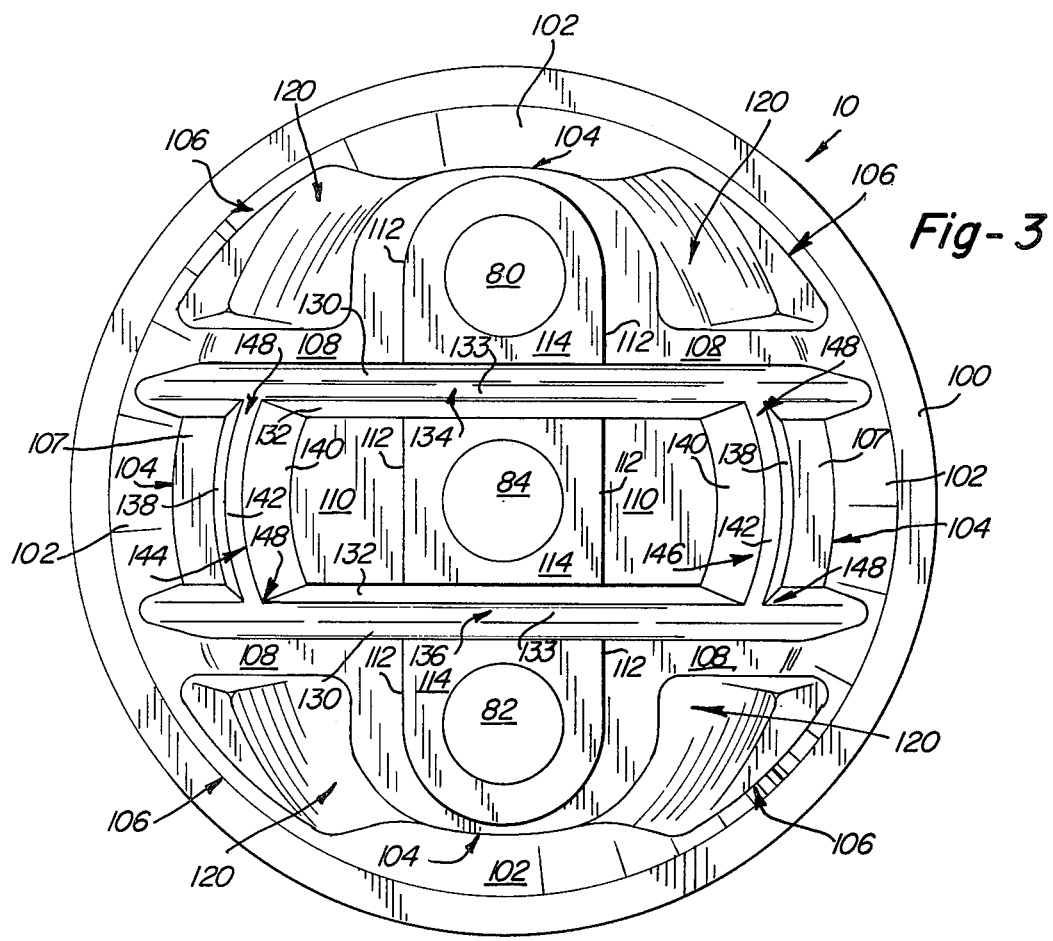
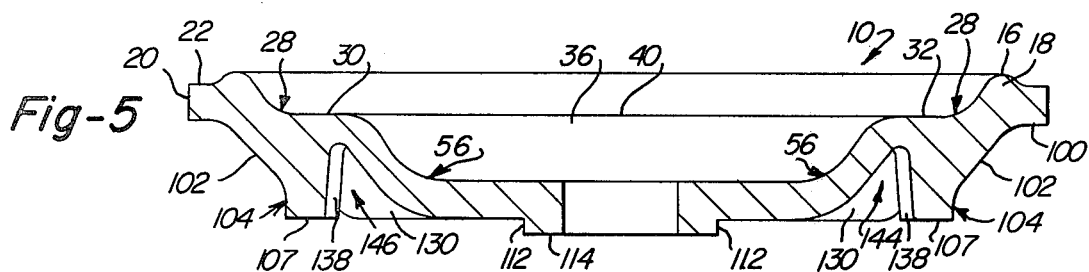
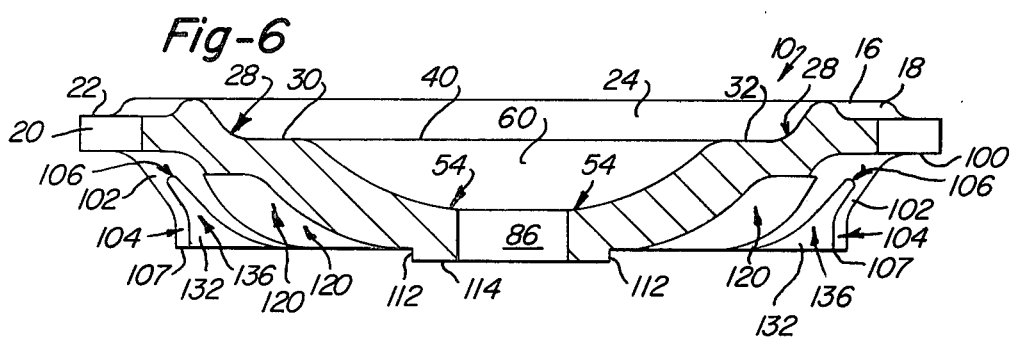

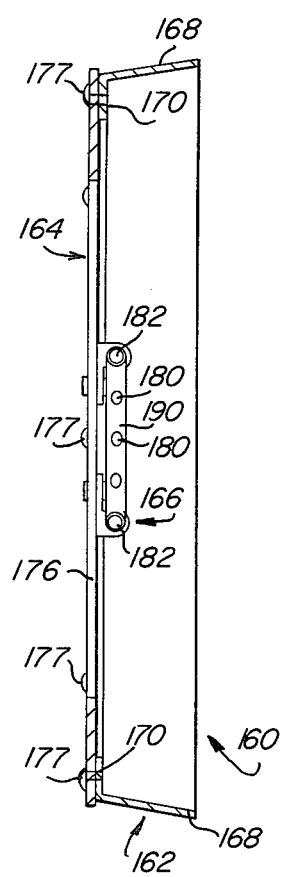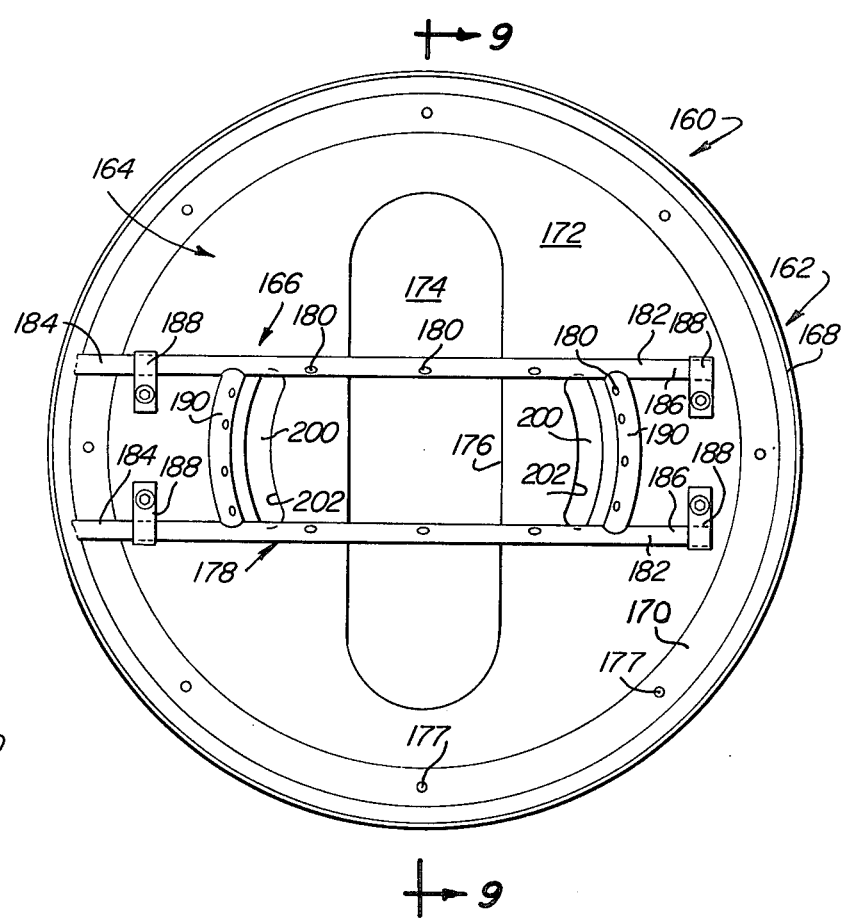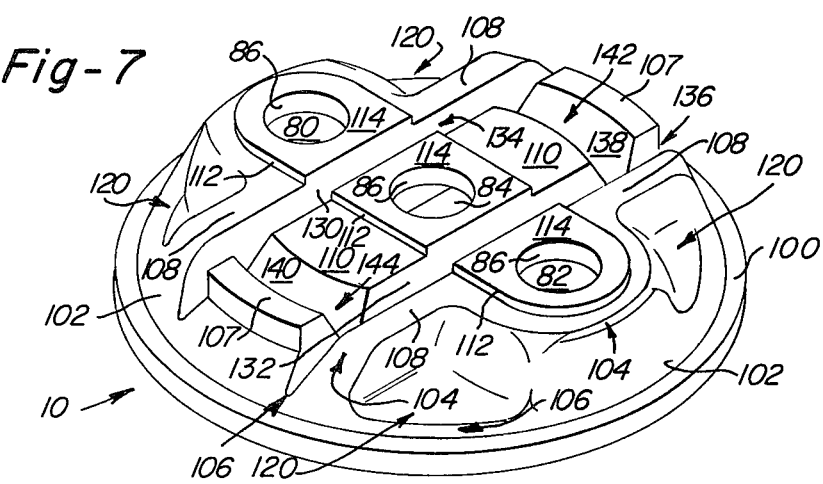

APPARATUS AND METHOD FOR OBTAINING UNIFORM GOBS IN A TRIPLE GOB FEEDER

BACKGROUND AND SUMMARY OF THE INVENTION

The invention relates to an apparatus and method for obtaining uniform gobs in a triple gob feeder of a molten glass forming apparatus, and more particularly for obtaining uniform gobs by providing uniform molten glass temperatures in a triple gob orifice ring.

In a common commercial process for the production of glass containers, such as bottles, jars and the like, and other types of glassware, glass components are initially heated to an elevated temperature level, such as 2000° to 2100° F., in a forehearth to form a relatively uniform mass of molten glass. The molten glass is fed to a spout bowl having a glass discharge hole in a central portion of the bottom wall of the bowl. A tube is provided in the spout bowl having a diameter slightly larger than the discharge hole and adapted to engage the bottom wall of the spout bowl surrounding the glass discharge hole. The tube is raised and lowered to regulate the flow of molten glass in the spout bowl through the discharge hole. The molten glass is then received by and temporarily stored in an orifice ring positioned immediately below the discharge hole of the spout bowl. Molten glass in the orifice ring is urged through orifices in the orifice ring at regular intervals by reciprocating plungers mounted above the orifice ring in axial alignment with the orifices. As the molten glass flows through the orifices, it is formed into a continuous rod-like body of glass which is cut by shears mounted below the orifice ring into discrete units of desired size, referred to as "gobs". Commonly used orifice rings have one, two or three orifices (referred to as "single gob", "double gob" or "triple gob" orifice rings, respectively) to simultaneously produce one, two or three gobs. Prior examples of triple gob orifice rings are disclosed in U.S. Pat. No. 3,516,812 and U.S. Design Pat. No. De. 241,269. The gobs produced by the foregoing process are then fed to additional glass forming apparatus to be formed into the desired article.

In the commercial application of the foregoing process, uniformity of the size and shape of gobs produced is critical not only to ensure production of a uniform, quality article, but also to minimize use of excess glass while ensuring sufficient glass in the gob to produce a minimum wall thickness in a container, such as a bottle. The size and shape of gobs produced is highly dependent on the viscosity of the molten glass in the orifice ring and therefore upon the temperature of the glass flowing through the ring orifices. It has been found that it is particularly difficult to maintain uniform temperatures of glass flowing through the orifices of a conventional triple gob orifice ring having three orifices oriented in the ring with orifice centers in substantially linear alignment forming two end orifices located adjacent the sides of the orifice ring and a middle orifice located in a central portion of the orifice ring. With such an arrangement, molten glass adjacent the end orifices is cooled relatively more than molten glass adjacent the middle orifice due to the proximity of the end orifices to the sides of the orifice ring. Presently used designs additionally pack more insulation around a middle reservoir supplying molten glass to the middle orifice than end reservoirs supplying molten glass to the end orifices, thereby compounding the problem. With a relatively higher temperature of molten glass adjacent the middle orifice, the glass flowing through that orifice tends to have a relatively lower viscosity resulting in the production of gobs from the middle orifice of relatively higher glass content and elongated shape. Some prior art triple gob orifice rings further increase the problems of uniform gob production by utilizing orifices of uneven wall height.

It has now been found that the foregoing problems can be overcome and gobs of uniform size, weight, volume and shape can be produced in a triple gob feeder, by equalizing the temperatures of the molten glass flowing through a triple gob orifice ring by retaining molten glass in a middle molten glass reservoir of the orifice ring for a relatively longer average period of time than in end reservoirs of the ring, and, preferably, by additionally cooling the middle reservoir of the ring. The uniformity of gobs produced may be further improved by providing orifices in the ring having a uniform height.

BRIEF DESCRIPTION OF THE DRAWINGS

An illustrative and presently preferred embodiment of the inventive concepts is shown in the accompanying drawing in which:

FIG. 1 is a perspective view of an orifice ring of the invention;

FIG. 2 is a top view of the orifice ring of FIG. 1;

FIG. 3 is a bottom view of the orifice ring of FIGS. 1 and 2;

FIG. 4 is a side elevational view in cross-section of the orifice ring of FIGS. 1–3 taken along the line 4—4 in FIG. 2;

FIG. 5 is a side elevational view in cross-section of the orifice ring of FIGS. 1–4 taken along the line 5—5 in FIG. 2;

FIG. 6 is a side elevational view in cross-section of the orifice ring of FIGS. 1–5 taken along the line 6—6 in FIG. 2;

FIG. 7 is a perspective view of the bottom of the orifice ring of FIGS. 1–6;

FIG. 8 is a top view of orifice ring holder means adapted to be used in association with the orifice ring of FIGS. 1–7; and FIG. 9 is a side elevational view in cross-section of the orifice ring holder means of FIG. 8 taken along the line 9—9 in FIG. 8.

DESCRIPTION OF PREFERRED AND ILLUSTRATIVE EMBODIMENTS

As hereinafter described, the orifice ring and orifice ring holder means are generally referred to in the vertical, upright position as normally located in use. Thus, such terms as "upper", "top", "lower" and "bottom" refer to the vertical upright position. In addition, such terms as "axial" and "axially extending" refer to the central vertical axis of the orifice ring when located in the vertical, upright position. Such terms as "radial" and "radial extending" relate to the central vertical axis. The method and apparatus of the invention is adapted to be used in association with conventional gob feeder systems, such as, for example, a Hartford Gob Feeder Type 503, manufactured by the Hartford Division of Emhart Corporation, Hartford, Conn., or the like.

Referring now to FIG. 1–6, apparatus for forming molten glass into discrete gobs comprises orifice ring 10 having a generally circular peripheral configuration, a contoured top surface portion 12 and a contoured bottom surface portion 14. As best shown in FIGS. 2 and 4-6, the uppermost portion of contoured top surface portion 12 is defined in part by the uppermost portion 16 of lip 18 extending around the periphery of the orifice ring. Rim portion 20 extends radially outwardly from lip 18 and has an upper flat surface portion 22 which merges into lip 18 below the uppermost surface portion 16 of the lip. The upper flat surface 22 of rim portion 20 and the lip 18 are adapted to be placed in sealed engagement with a lower outlet opening of a conventional refractory spout (not shown) so as to prevent molten glass from escaping over the uppermost porton 16 of lip 18 during use of the apparatus.

From the uppermost portion 16 of lip 18, the contoured top surface portion 12 of the orifice ring extends radially inwardly and axially downwardly along sloped, upper surface wall portions 24 to an area adjacent the lowermost portions of the top surface of the orifice ring at regions generally shown at 26 and to an area in an intermediate portion of the top surface portion of the orifice ring at regions generally shown at 28. At the intermediate regions shown at 28, the wall portion 24 merges into generally flat intermediate surface portions 30, 32 on opposite sides of the top surface porton 12 of the orifice ring. The intermediate surface portions 30, 32 are interconnected by wall surface portions 34, 36 having uppermost surface portions 38, 40, respectively, located in a plane including generally flat intermediate surface portions 30, 32.

From generally flat intermediate surface portions 30, 32, the contoured top surface portion 12 of the orifice ring extends radially inwardly and axially downwardly along sloped wall surface portions 42, 44, 46, 48 and along sloped wall surface portions 50, 52 to areas 54, 56, 58 adjacent the lowermost portions of the top surface of the orifice ring. From the uppermost surface portions 38, 40 of wall surface portions 34, 36, the contoured top surface portion 12 of the orifice ring extends downwardly along curved surface wall portions 60, 62, 64, 66 to the areas generally shown at 61, 63, 65, 67 adjacent the lowermost portions of the top surface of the ring.

The wall surface portions 24, 30-52 and 60-66 merge at intersecting areas so as to provide a continuous surface adapted to permit the free flow of molten glass thereover, as will be hereinafter further described.

The contoured top surface portion 12 of the orifice ring, as previously described, defines three reservoir means 68, 70, 72 for receiving and temporarily storing molten glass. The reservoir means are oriented in the top surface portion of the orifice ring so as to define two end reservoir means 68, 72 defined by side wall surfaces 24, 42, 48, 60 and surfaces 24, 44, 46, 66, respectively, and a middle reservoir means 70 defined by sidewall surfaces 50, 52, 62, 64. The middle reservoir means 70 is adapted to provide a relatively longer average residence time for molten glass than the average residence time in the end reservoir means. This is accomplished in the presently preferred and illustrative embodiment of FIGS. 1-6 by sizing the middle reservoir means 70 volumetrically relatively larger than the end reservoir means 68, 72, such as by elongating the sidewall surface portions 62, 64 of the middle reservoir means relative to the side wall surface portions 60, 66 of the end reservoir means, while maintaining the width and depth of the three reservoir means at an approximately uniform level.

The apparatus further comprises orifice means associated with each reservoir means for permitting passage of molten glass through the orifice ring. Referring particularly to FIGS. 1, 2 and 4, the orifice means comprise orifices 80, 82 associated with the end reservoir means 68, 72, respectively, and orifice 84 associated with the middle reservoir means 70, located in a central bottom portion of the reservoir means. The orifices are defined by orifice side walls 86 extending from the lowermost surface portions of the reservoir means to the lower surface portion 14 of the orifice ring, each orifice preferably having a circular cross-sectional peripheral configuration of uniform area wherein the orifice side walls 86 are of uniform height, of for example ⅜ in., along the perimeter of the orifices providing for uniform flow of molten glass past the orifice side walls at any radial location, as will be hereinafter further described.

Referring now to FIGS. 3-7, the contoured bottom surface portion 14 of orifice ring 10 is defined in part by uppermost bottom surface portion 100 of rim portion 20 of the ring, which extends around the periphery of the ring beneath upper flat surface 22 of the rim portion 20. From uppermost bottom surface portion 100, the contoured bottom surface portion 14 of the orifice ring extends radially inwardly and axially downwardly along sloped bottom wall portions 102 to areas adjacent the lower portions of the bottom surface portion of the orifice ring at regions generally shown at 104 and to areas in an intermediate portion of the bottom surface portion of the orifice ring at areas generally shown at 106. At the areas adjacent the lower portions of the bottom surface portion generally shown at 104, the wall portion 102 merges into generally flat lower bottom surfaces 107. The contoured bottom surface portion is further defined by generally flat lower bottom surfaces 108, 110 which are located in a plane including surfaces 107. From the surfaces 108, 110 the contoured bottom surface portion extends axially downwardly along surfaces 112 and then radially inwardly along lowermost generally flat bottom surface portions 114. The peripheral configuration of lowermost surface portions 114, as defined by surfaces 112, is adapted to be received in and fit through a corresponding passagesay in an orifice ring holder means, as will be hereinafter further described.

The plane including surfaces 107, 108 and 110, and the sloping wall portion 102, are broken by areas of depression 120 in the contoured bottom surface portion of the ring adapted to receive and store a suitable insulation material for insulating the end reservoir means 68, 72 against thermal loss. The plane and sloping wall portion 102 are further broken by sloping wall portions 130, 132 interconnected by curved wall portions 133 defining first-type substantially parallel elongated channel means 134, 136 is the contoured bottom surface portion 14 of the orifice ring extending along the outside of the middle reservoir means 70 generally parallel to middle reservoir means side wall surfaces 62, 64 and by curved, sloping wall portions 138, 140 interconnected by curved wall portions 142 defining second-type substantially parallel channel means 144, 146 in the contoured bottom surface portion 14 of the ring extending along the outside of the middle reservoir means 70 generally parallel to middle reservoir means side wall surfaces 50, 52. The sloping wall portions 132 and the curved wall portions 140 define the outisde side surface portions of the middle reservoir means 70. The second-type channel means intersect the first-type channel means at areas generally shown at 148 providing channel means extending substantially completely around the outside periphery of the middle reservoir means 70. The channel means provide means for cooling the middle reservoir means by providing for exposure of the outside side surface portions of the middle reservoir means to a suitable coolant, as will be hereinafter further described.

Referring now to FIGS. 8 and 9, the apparatus further comprises orifice ring holder means 160 for receiving, seating and holding the orifice ring in place during use, having a side wall 162, a bottom wall 164 and coolant supply means 166. Holder side wall 162 comprises radially inwardly and axially downwardly sloped holder side wall portion 168 having a generally circular peripheral cross-sectional configuration and an integral, radially inwardly extending flange portion 170. Holder bottom wall 164 comprises a generally flat wall member 172 having a first-type passageway 174 through the wall member 172 defined by passageway edge surface 176 and being peripherally shaped similarly to and sized slightly larger than flat bottom surface portions 114 of orifice ring 10 so as to permit passage of the bottom surface portions 114 of the orifice ring therethrough. Holder bottom wall 164 is adapted to be fixed to flange portion 170 by suitable fastening means, such as rivets 177, or the like. Coolant supply means 166 for supplying coolant to the channel means of the orifice ring comprises conduit means 178 for conveying a coolant therethrough, fluid communication means, such as orifices 180, providing fluid communication between the conduit means 178 and the channel means of the orifice ring, and means, such as a source of pressurized air or other coolant (not shown), for supplying coolant to the conduit means. As shown in the illustrative embodiment of FIG. 8, conduit means 178 comprises two first-type conduits 182, each having a first end portion 184 extending through holder side wall 168 and adapted to be suitably connected to the source of pressurized air or other coolant, and a second end portion 186 adapted to be closed, such as with a cap or plug (not shown), to the passage of the coolant. The first-type conduits 182 extend in parallel relationship substantially across the holder bottom wall 164 and may be fixed thereto such as by mounting clips 188. Conduit means 178 further comprises two second-type conduits 190 interconnected with and providing fluid communication between the two first-type conduits 182 on opposite sides of the bottom wall first-type pasageway 174. The arrangement of the two first-type conduits 182 and the two second-type conduits 190 with respect to holder means 160 is such that when orifice ring 10 is received and seated in the holder means 160 with the flat bottom surface portions 114 of the orifice ring extending through the first-type passageway 174 of the holder means, the first-type conduits 182 are received in the first-type channel means 134, 136 in the bottom surface of the orifice ring, the second-type conduits 190 are received in the second-type channel means 144, 146 in the bottom surface portion of the orifice ring, and orifices 180 are located in the first-and second-type conduits so as to supply and disperse coolant across the outside side surface portions of the middle reservoir means of the orifice ring.

The holder means preferably further comprises escape means for allowing escape of coolant from the holder means during use of the apparatus. Referring to FIG. 8, the escape means may comprise at least one, and preferably two, second-type passageways 200 through the holder means bottom wall 164 providing fluid communication between the orifice ring receiving side of the holder means and the outside of the holder means when the orifice ring is received by and seated in the holder means. The peripheral configuration of the second-type passageways 200, as defined by second-type passageway edge surface 202, preferably corresponds to the configuration of the second-type channel means 144, 146, and the second-type passageways are preferably oriented in proximity to the second-type channel means when the orifice ring is seated in the holder means so as to provide for free flow of coolant from the conduit means through the channel means, and then out of the holder means through the second-type passageways.

In use of the apparatus as previously described, orifice ring 10 is seated in holder means 160 with thermal insulation packing material placed in, and preferably filling, the areas of depression 120 in the contoured bottom surface portion 14 of the orifice ring. A sealant is then placed on the flat surface portion 22 or entire ring rim 20 and the orifce ring and holder means is clamped to the bottom of a conventional refractory spout. The conduit means 178 are then connected to a coolant supply, such as a source of pressurized air. While for reasons of economy, pressurized air is the presently preferred coolant, other suitable coolants include relatively non-flamable gases and liquids.

Molten glass is supplied to the refractory spout from a conventional forehearth and regulated amounts of the molten glass are permitted to flow into proximity of the spout discharge opening to cover the contoured upper surface portion of the orifice ring by raising and lowering a conventional spout tube. Plungers located in the spout tube in axial alignment with orifices 80, 82, 84 are raised and lowered a regulated distance, and at a regulated rate, to urge a portion of the molten glass through orifices 80, 82, 84 to form the molten glass into three rod-like molten glass members of generally uniform cross-sectional configuration. Shears located a regulated distance beneath the orifice ring and holder means then shear the molten glass rod-like members into discrete gobs of a desired size, which are transported to suitable forming apparatus for forming the gobs into a finished article, such as a bottle or jar.

In order to obtain uniform gob size and shape, the conditions to which the molten glass is subjected as it passes through orifices 80, 82, 84 must be the same, or closely similar, for each orifice. However, as previously described, molten glass in the end reservoir means 68, 72 tends to experience a greater temperature loss prior to flowing through orifices 80, 82 then molten glass in the middle reservoir means 70 due to the proximity of the end reservoir means to the sides of the orifice ring. The present method and apparatus thus provides for equalization of molten glass temperatures by providing two end reservoir means of similar size, configuration and orientation for maintaining the average residence time of molten glass at a relatively constant level, and a middle reservoir means sized relatively larger than the end reservoir means for maintaining the average residence time of molten glass in the middle reservoir means at a relatively constant level which is longer than the averge residence time in the end reservoir means, thereby permitting a longer cooling period for molten glass in the middle reservoir means. The molten glass in the middle reservoir means is further cooled by flowing a coolant over the outside side surfaces of the middle reservoir means, as heretofore described. The nature and amount of coolant utilized to cool the middle reservoir means is optimally designed to obtain a uniform, desired temperature of the molten glass flowing through the orifices 80, 82, 84.

The method and apparatus described herein allow production of molten glass gobs having a uniform molten glass viscosity in a triple gob feeder, resulting in uniform cooling temperature profiles for gobs produced from each orifice. In addition, since the gob formation temperatures are equalized at all three orifices, the gobs produced are of a uniform size and configuration, thereby enhancing the uniformity and quality of the desired end product.

While the foregoing method and apparatus has been described in association with a presently preferred illustrative embodiment, various modifications may be made without departing from the inventive concepts. Such modifications are intended to be within the scope of the appended claims except insofar as limited by the prior art.

What is claimed is:

1. Apparatus for forming molten glass into discrete gobs, comprising an orifice ring having a contoured top surface portion defining three reservoir means for receiving and temporarily storing molten glass and an orifice means associated with each reservoir means for permitting passage of molten glass through the orifice ring, the reservoir means being oriented in the orifice ring to define two end reservoir means and a middle reservoir means, and the middle reservoir means being volumetrically sized relatively larger than the end reservoir means for providing a relatively longer residence time of molten glass in the middle reservoir means than in the end reservoir means.

2. The apparatus of claim 1 wherein the three reservoir means have approximately the same width and depth and the middle reservoir means is elongated relative to the end reservoir means to define elongated side surface portions of the middle reservoir means providing the relatively larger volumetric size.

3. The apparatus of claim 1 wherein the orifice means comprises a passageway through the orifice ring defined by an orifice side wall having a substantially circular cross-sectional configuration and a substantially uniform height.

4. The apparatus of claim 1 or 2 which further comprises cooling means for cooling the middle reservoir means.

5. The apparatus of claim 4 wherein the cooling means comprises channel means in a contoured bottom surface portion of the orifice ring extending along the outside of the middle reservoir means to define outside side surface portions of the middle reservoir means for providing exposure of the outside side surface portions of the middle reservoir means to a coolant.

6. The apparatus of claim 5 wherein the channel means comprise two first-type substantially parallel elongated channels in the bottom surface portion of the orifice ring extending substantially parallel to the elongated side surface portions of the middle reservoir means.

7. The apparatus of claim 6 wherein the channel means further comprises two second-type channels in the bottom surface portion of the orifice ring extending substantially parallel to end surface portions of the middle reservoir means, the second-type channels intersecting the first-type channels so that the channel means extend substantially completely around the outside periphery of the middle reservoir means.

8. The apparatus of claim 7 which further comprises orifice ring holder means adapted to receive and hold the orifice ring in use, and wherein the cooling means further comprises coolant supply means in the holder means for supplying coolant to the channel means.

9. The apparatus of claim 8 wherein the coolant supply means comprises conduit means in the channel means for conveying coolant therethrough, fluid communication means providing fluid communication between the conduit means and the channel means and means for supplying coolant to the conduit means.

10. The apparatus of claim 9 wherein the conduit means comprises two first-type conduits adapted to be received in and convey coolant through the first-type channels, and two second-type conduits adapted to be received in and convey coolant through the second-type channels, the second-type conduits being interconnected with and providing fluid communication between the first-type conduits.

11. The apparatus of claim 8 wherein the cooling means further comprises escape means for allowing escape of coolant from the holder means.

12. The apparatus of claim 11 wherein the escape means comprises at least one opening in the holder means providing fluid communication between the orifice ring receiving side of the holder means and the outside of the holder means.

13. The apparatus of claim 12 wherein the at least one opening is oriented in proximity to at least one of the second-type channels when the orifice ring is received in and held by the holder means.

14. The apparatus of claim 9 wherein the fluid communication means comprises a plurality of orifices in the conduit means oriented so as to direct coolant onto the outside surfaces of the middle reservoir means.

15. A method of obtaining uniform gob size in a triple gob feeder comprising an orifice ring having two end reservoirs and a middle reservoir for receiving and temporarily storing molten glass and an orifice associated with each reservoir permitting flow of molten glass through the orifice ring, comprising:

supplying molten glass to two end reservoirs and to a middle reservoir in an orifice ring;

maintaining the average residence time of molten glass in the two end reservoirs at a relatively constant level;

maintaining the average residence time of molten glass in the middle reservoir at a relatively constant level which is longer than the average residence time of molten glass in the two end reservoirs by forming the middle reservoir at a volumetric size relatively larger than that of each of the end reservoirs, and then urging a regulated portion of the molten glass in each reservoir through an orifice associated with each reservoir at a regulated rate.

16. The method of claim 15 which further comprises cooling the molten glass in the middle reservoir.

17. The method of claim 16 wherein the molten glass in the middle reservoir is cooled by flowing a coolant across an external surface of the middle reservoir.

* * * * *